United States Patent
Rehm et al.

(10) Patent No.: US 9,214,182 B2
(45) Date of Patent: Dec. 15, 2015

(54) FLUID DYNAMIC BEARING SYSTEM AND A SPINDLE MOTOR HAVING THIS KIND OF BEARING SYSTEM

(75) Inventors: Thilo Rehm, Villingen-Schwenningen (DE); Martin Bauer, Villingen-Schwenningen (DE)

(73) Assignee: MINEBEA CO., LTD., Nagano-Ken (JP)

( * ) Notice: Subject to any disclaimer, the term of this patent is extended or adjusted under 35 U.S.C. 154(b) by 1119 days.

(21) Appl. No.: 13/104,205

(22) Filed: May 10, 2011

(65) Prior Publication Data

US 2011/0285231 A1   Nov. 24, 2011

(30) Foreign Application Priority Data

May 21, 2010 (DE) .......................... 10 2010 021 238

(51) Int. Cl.
- *H02K 5/167* (2006.01)
- *F16C 17/10* (2006.01)
- *G11B 19/20* (2006.01)
- *F16C 33/10* (2006.01)
- *F16C 33/74* (2006.01)

(52) U.S. Cl.
CPC .......... *G11B 19/2036* (2013.01); *F16C 17/107* (2013.01); *F16C 33/103* (2013.01); *F16C 33/107* (2013.01); *F16C 33/745* (2013.01); *H02K 5/1675* (2013.01); *F16C 2370/12* (2013.01)

(58) Field of Classification Search
CPC .......... F16C 17/10; F16C 32/00; F16C 32/02; F16C 33/74; F16C 33/103; F16C 33/107; F16C 2370/12; H02K 5/167; H02K 5/1675

USPC .......... 310/90; 384/100, 107, 110, 112, 121, 384/123
See application file for complete search history.

(56) References Cited

U.S. PATENT DOCUMENTS

| 7,201,517 B2 | 4/2007 | Gomyo |
| 7,868,499 B2 | 1/2011 | Kim |
| 2005/0031237 A1* | 2/2005 | Gomyo et al. ................ 384/110 |

(Continued)

FOREIGN PATENT DOCUMENTS

| DE | 102005032630 | 2/2007 |
| DE | 102007036790 | 2/2009 |

(Continued)

*Primary Examiner* — Quyen Leung
*Assistant Examiner* — Eric Johnson
(74) *Attorney, Agent, or Firm* — Cooper & Dunham LLP

(57) ABSTRACT

The invention relates to a fluid dynamic bearing system having a bearing bush and a shaft that are rotatable with respect to one another about a common rotational axis and form a bearing gap filled with bearing fluid between associated bearing surfaces. The bearing surfaces form at least one fluid dynamic radial bearing. A rotor component is disposed on the shaft. A stopper ring is disposed on the shaft or on the rotor component and adjoins the bearing bush, wherein a gap is formed between the mutually facing surfaces of the bearing bush and the stopper component that is filled with a bearing fluid and connected to the bearing gap and extends substantially in a radial direction. According to the invention, the surfaces of the bearing bush and/or the stopper component are formed such that the gap is tapered, narrowing radially outwards. Moreover, a recirculation channel may be provided in the bearing bush that connects a gap region between the bearing gap and the sealing gap radially outside the axial bearing to a gap region radially outside the stopper component.

20 Claims, 9 Drawing Sheets

(56) References Cited

U.S. PATENT DOCUMENTS

2007/0013249 A1    1/2007   Engesser
2007/0222314 A1*   9/2007   Drautz ............................ 310/90
2008/0309185 A1*   12/2008   Popov ......................... 310/90.5

FOREIGN PATENT DOCUMENTS

DE    102009022536    12/2010
DE    102009034021    1/2011

* cited by examiner

FLUID DYNAMIC BEARING SYSTEM AND A SPINDLE MOTOR HAVING THIS KIND OF BEARING SYSTEM

BACKGROUND OF THE INVENTION

The invention relates to a fluid dynamic bearing system having a bearing bush and a shaft that are rotatable with respect to one another about a common rotational axis and form a bearing gap filled with bearing fluid between associated bearing surfaces, the bearing surfaces forming at least one fluid dynamic radial bearing. These kinds of fluid dynamic bearings are used, for example, for the rotatable support of spindle motors that, in turn, are used for driving hard disk drives, ventilators or suchlike.

DESCRIPTION OF THE PRIOR ART

Fluid dynamic bearings, as used in spindle motors, generally comprise at least two bearing parts that are rotatable with respect to one another and form a bearing gap filled with a bearing fluid, such as air or bearing oil, between associated bearing surfaces. Grooved bearing patterns that are associated with the bearing surfaces and that act on the bearing fluid are provided using a well-know method. In fluid dynamic bearings, the grooved bearing patterns taking the form of depressions or raised areas are usually formed on one or both mutually opposing bearing surfaces. The grooved bearing patterns act as bearing and/or pumping patterns that generate hydrodynamic pressure within the bearing gap when the bearing parts rotate with respect to each other due to the pumping effect exerted on the bearing fluid. In the case of a fluid dynamic bearing of a spindle motor for driving hard disk drives according to a well-known design, a shaft is rotatably supported in a bearing bore of a bearing bush. The diameter of the bore is slightly larger than the diameter of the shaft, so that a bearing gap filled with bearing fluid remains between the surfaces of the bearing bush and the shaft. The mutually facing surfaces of the shaft and/or the bearing bush have pressure-generating grooved bearing patterns forming a part of at least one fluid dynamic radial bearing. A free end of the shaft is connected to a rotor component (hub) whose lower surface, together with an end face of the bearing bush, forms a fluid dynamic axial bearing. For this purpose, one of the mutually facing surfaces of the rotor component or the bearing bush is provided with pressure-generating grooved bearing patterns.

In order to limit any excessive axial movement of the shaft within the bearing bush, a stopper component, taking, for example, the form of a stopper ring, is often used. The stopper component is disposed either on the shaft or on a rotor component connected to the shaft and strikes against an opposing surface of the bearing bush as soon as the shaft is axially displaced by more than a permissible extent. This prevents the shaft from falling out of the bearing bush. It is known to connect the stopper ring either as a separate annular component to the shaft or the rotor component or to form it integrally with the shaft as one piece.

Should the bearing be subjected to a shock, particularly an axial shock, i.e. axial accelerating forces, the shaft as well as the stopper ring then move within the bearing bush, whereby the bearing fluid, which is disposed in a narrow gap between the stopper ring, bearing bush and the cover plate, is squeezed out of the corresponding gap. Depending on these accelerating forces, especially the stopper ring, which is only a few tenths of a millimeter thick, becomes deformed, by, for example, a few micrometers. This expression of bearing fluid serves to dampen the system. Should the deformation of the stopper ring be too great, it may possibly strike against an adjoining surface of the bearing bush, since the damping effect is weakened by such an event. This jarring impact is transmitted to the shaft and to a rotor component connected to the shaft. If the bearing is used, for example, for rotatably supporting a spindle motor, as used for driving a hard disk drive, this jarring impact of the stopper ring on the bearing bush may cause the read/write head of the hard disk drive to strike against the magnetic storage disk fixed to the rotor component and to damage this storage disk. In a worst case scenario, this could lead to the loss of data.

Moreover in up-to-date bearings, bearing fluids having lower viscosity are used so as to keep friction as low as possible and to reduce the energy consumption of a spindle motor. This, however, results in a reduced damping effect of the bearing fluid in the event of a shock. When the bearing is in operation, i.e. when the bearing is in hydrodynamic equilibrium, the width of the gap, i.e. the distance between the surface of the bearing bush and the stopper ring, is, for example, 10 to 40 micrometers. In the event of an extreme shock, this distance is reduced to zero, the stopper ring particularly touching the bearing bush at only a few points, thus causing very high accelerating forces to be transmitted to the shaft and the hub. All dimensions stated in this specification relate to a fluid dynamic bearing to be used in a spindle motor for driving a typical 2.5 or 3.5 inch hard disk drive.

This effect is intensified further if a recirculation channel merges into this gap between the bearing bush and the stopper ring. The recirculation channel allows the bearing fluid found in the gap between the bearing bush and the stopper ring to flow off relatively unimpeded without having to pass through the full length of the gap. The desired damping effect through displacing the bearing fluid radially outwards out of the gap is greatly reduced since the bearing fluid takes the path of least resistance and to a large extent flows out of the gap through the much larger recirculation channel.

SUMMARY OF THE INVENTION

It is the object of the invention to provide a fluid dynamic bearing system of the type described at the outset that has improved shock resistance.

This object has been achieved according to a first embodiment of the invention by a fluid dynamic bearing system that comprises a bearing bush and a shaft that are rotatable with respect to one another about a common rotational axis and form a bearing gap filled with bearing fluid between associated bearing surfaces. The bearing surfaces form at least one fluid dynamic radial bearing. A rotor component is disposed on the shaft. A stopper component is disposed on the shaft or on the rotor component and adjoins the bearing bush, a gap being formed between the mutually facing surfaces of the bearing bush and the stopper component, the gap being filled with bearing fluid and connected to the bearing gap and extending substantially in a radial direction.

According to the invention, the surfaces of the bearing bush and/or the stopper component are formed such that the gap located between these two is tapered, narrowing radially outwards.

In a preferred embodiment of the invention, for example, the surface of the bearing bush lying opposite the stopper component extends at a slight slant with respect to the surface of the stopper component, so that the annular gap between the two components tapers radially outwards and forms a kind of throttle. Since, due to the small radial bearing gap, the bearing fluid cannot escape in the bearing gap along the radial bearing, in the event of a shock impulse, the bearing fluid found in the annular gap is squeezed out of the annular gap and has to pass through this throttle, which spreads the impulse response to the shock impulse and produces an improved damping of the system.

In another embodiment of the invention the surface of the stopper component lying opposite the bearing bush may, for example, extend at a slight slant with respect to the surface of the bearing bush, so that the annular gap between the two components also tapers radially outwards and forms a throttle as described above. As an alternative, the axial thickness of the stopper component is slightly smaller radially inwards than radially outwards, so that the annular gap between the stopper component and the bearing bush tapers radially outwards.

The axial annular gap between the bearing bush and the stopper component is preferably some 5 to 25 micrometers wider at its radially inner end than at its radially outer end, thus producing a significant narrowing of the gap in the direction of the radially outer edge of the stopper component.

In one embodiment of the invention, the stopper component is disposed at one end of the shaft and is received in a recess in the bearing bush. The recess is disposed at an end face of the bearing bush and is closed by a cover plate. The surface of the stopper component is separated by another disk-shaped gap from the adjoining surface of the cover plate, this disk-shaped gap being fully filled with bearing fluid and connected along the outside circumference of the stopper component to the annular gap.

In a further preferred embodiment of the invention, the free end of the shaft is connected to a cup-shaped rotor component that partly encloses the bearing bush while at the same time forming a sealing gap. The sealing gap is connected to the bearing gap and proportionally filled with bearing fluid. The sealing gap, together with the bearing fluid found therein, preferably forms a capillary seal. The sealing gap moreover acts as a supply reservoir for the bearing fluid.

If the stopper component is disposed on the rotor component according to the invention, it partially encloses the bearing bush and, together with the bearing bush, forms a sealing gap sealing the bearing gap.

The at least one radial bearing is, for example, marked by grooved bearing patterns that are disposed on one wall of the bearing bore of the bearing bush or on the surface of the shaft. Two radial bearings are preferably disposed at an axial distance from one another along an axially extending section of the bearing gap.

Pressure-generating grooved bearing patterns are formed on the end face of the bearing bush and/or on a surface of the rotor component lying opposite this end face, the pressure-generating grooved bearing patterns forming part of a fluid dynamic axial bearing which absorbs the axial loads. The axial bearing is disposed along a radially extending section of the bearing gap.

As an alternative or in addition, an end face of the stopper component and/or a surface of the cover plate lying opposite this end face may be provided with pressure generating grooved bearing patterns and form a fluid dynamic axial bearing.

According to a second preferred embodiment of the invention, the fluid dynamic bearing system comprises a bearing bush and a shaft that are rotatable with respect to one another about a common rotational axis; a bearing gap that is disposed between associated bearing surfaces and filled with a bearing fluid, the bearing surfaces forming at least one fluid dynamic radial bearing; a rotor component disposed on the shaft; a stopper component that is disposed on the shaft or on the rotor component and adjoins the bearing bush; an annular gap that is formed between the mutually facing surfaces of the bearing bush and of the stopper component, the annular gap being filled with a bearing fluid and connected to the bearing gap and extending substantially in a radial direction, a recirculation channel being provided in the bearing bush that connects a gap region between the bearing gap and the sealing gap radially outside the axial bearing to a gap region radially outside the stopper component.

This second embodiment of the invention may be advantageously combined with the first embodiment of invention, which consists of the surfaces of the bearing bush and/or the stopper component being designed such that the gap lying in between is tapered, narrowing radially outwards.

It is preferable if—measured from the rotational axis—the smallest inside radius of the recirculation channel is larger than the largest outside radius of the stopper component.

In this case, the outside circumference of the stopper component can be additionally separated from the recirculation channel by a bridge. This arrangement of the recirculation channel ensures that the bearing fluid found in the annular gap between the bearing bush and the stopper component cannot flow directly through the recirculation channel, but rather has to first flow radially outwards through the gap before it can enter the recirculation channel.

It may be provided that the recirculation channel ends directly opposite the cover plate, where, in the region of a lower mouth of the recirculation channel between the bearing bush and a cover plate an annular undercut may preferably be provided in the bearing bush or in the cover plate. The undercut allows the bearing fluid to be distributed over the entire circumference of the bearing. The undercut is connected via at least one radially extending channel in the bearing bush or in the cover plate to the disk-shaped gap and thus to the circulation of fluid in the bearing.

The invention also relates to a fluid dynamic bearing system for a spindle motor as can be used for driving hard disk drives.

The invention is now explained in more detail on the basis of preferred embodiments with reference to the drawings as described below. Further characteristics, advantages and possible applications of the invention may be derived there from.

DESCRIPTION OF PREFERRED EMBODIMENTS OF THE INVENTION

Figure 1:
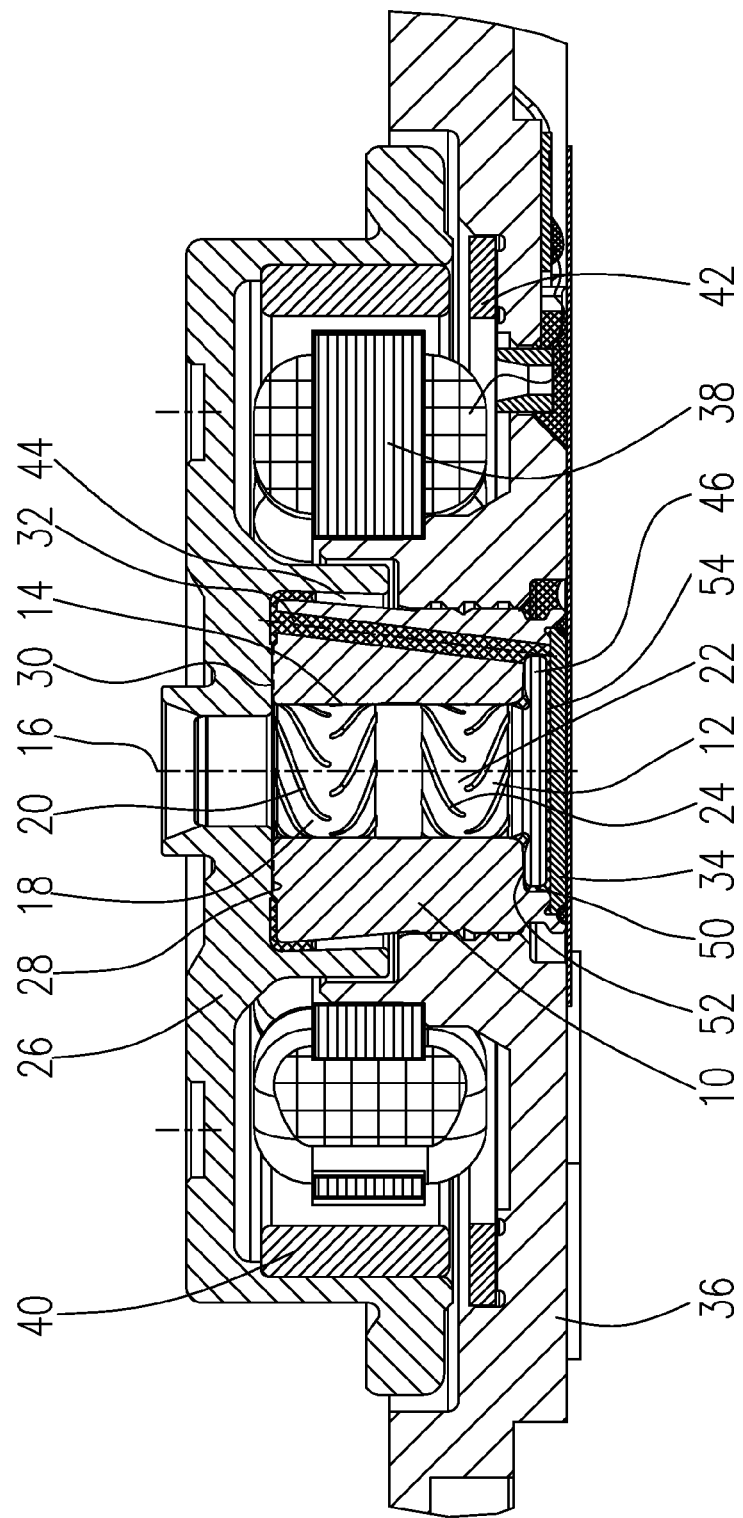
FIG. 1 shows a section through a first embodiment of a spindle motor having a fluid dynamic bearing according to the invention.

FIG. 1 shows a section through a spindle motor having a fluid dynamic bearing system according to the invention. The bearing system comprises a stationary bearing bush 10 that has a central bearing bore and that forms the stationary component of the bearing system. The bearing bush 10 has, for example, an outside diameter of approx. 6.5 mm; the bearing bore has a diameter of approx. 2.5 mm to 3.0 mm. A shaft 12 is inserted in the bore of the bearing bush 10 whose diameter is slightly smaller, i.e. by only a few micrometers, than the diameter of the bearing bore. A bearing gap 14 of a few micrometers in width remains between the surfaces of the bearing bush 10 and the shaft 12. The mutually opposing surfaces of the shaft 12 and the bearing bush 10 form two fluid dynamic radial bearings 18, 22, by means of which the shaft 12 is rotatably supported in the bearing bush 10 about a rotational axis 16. The radial bearings 18, 22 are marked by grooved bearing patterns 20, 24 that are formed on the surface of the shaft 12 and/or of the bearing bush 10. The bearing gap 14 is filled with an appropriate bearing fluid, such as a bearing oil. On rotation of the shaft 12, the grooved bearing patterns 20, 24 exert a pumping effect on the bearing fluid found in the bearing gap 14 between the shaft 12 and the bearing bush 10, so that hydrodynamic pressure is built up in the bearing gap 14 thus giving the radial bearings 18, 22 their load-carrying capacity. The upper radial bearing 18 preferably has asymmetric grooved bearing patterns 20 that pump the bearing fluid mainly in the direction of the lower radial bearing. The lower radial bearing 22 preferably comprises symmetrically designed grooved bearing patterns 24 that produce a uniform pumping effect in both directions of the bearing gap 14.

A free end of the shaft 12 is connected to a rotor component 26 that partially encloses the bearing bush. A lower, flat surface of the rotor component 26, together with an adjoining end face of the bearing bush 10, forms a fluid dynamic axial bearing 28. Here, the end face of the bearing bush 10 or the opposing surface of the cup-shaped rotor component 26 are provided with preferably spiral-shaped grooved bearing patterns 30, which on rotation of the shaft 12, exert a pumping effect on the bearing fluid found in the bearing gap 14 between the rotor component 26 and the upper end face of the bearing bush 10 directed radially inwards in the direction of the radial bearing 18, so that the axial bearing 28 is given its load-carrying capacity. A recirculation channel 32 may be provided in the bearing bush that connects together a section of the bearing gap 14 located at a radially outer edge of the axial bearing 28 to a section of the bearing gap 14 located beneath the lower radial bearing 22 and supports the circulation of bearing fluid in the bearing.

The bearing bush 10 is disposed in a baseplate 36 of the spindle motor. The bearing bush 10 is enclosed by a stator arrangement 38 that is disposed on the baseplate 36 and is made up of a ferromagnetic stator lamination stack as well as appropriate stator windings. This stator arrangement 38 is enclosed by a circumferential rim of the rotor component 26, on which an annular rotor magnet 40 is disposed. The rotor magnet 40 encloses the stator arrangement 38 in a radial direction while forming an air gap. An outer rotor motor is illustrated. It is clear that as an alternative an inner rotor motor could also find application. Below the rotor magnet 40, a ferromagnetic metal ring 42 may be disposed that attracts the rotor magnet 40, thus producing a force directed downwards towards the baseplate 36. This force acts in opposition to the bearing load of the axial bearing 28 and is used to axially preload the bearing system.

The bearing gap 14 comprises an axial section that extends along the shaft 10 and the two radial bearings 18, 22, and a radial section that extends along the end face of the bearing bush 10 and the axial bearing 28. At the radially outer end of its radial section, the bearing gap 14 merges into a gap having a larger gap distance, which partly acts as a sealing gap 44 and is proportionally filled with bearing fluid. Starting from the bearing gap 14, the gap initially extends radially outwards and merges into an axial section that extends along the outside circumference of the bearing bush 10 between the bearing bush 10 and a cylindrical section of the cup-shaped rotor component 26 and forms the sealing gap 44. For a bearing bush 10 diameter of a few millimeters, the width of the sealing gap 44 is typically 50-300 micrometers. The outer sleeve surface of the bearing bush 10 as well as the inner sleeve surface of the cup-shaped rotor component 26 are mainly cylindrical, although preferably slightly tapered, and form the boundary of the sealing gap 44. Since the upper opening of the recirculation channel 32 is disposed very close to the transitional zone between the bearing fluid and the atmosphere, air bubbles dissolved in the bearing fluid can escape relatively easily into the atmosphere.

On the end fixed in the baseplate, the bearing bush 10 has a recess 50 whose diameter is substantially larger than the diameter of the bearing bore. The diameter of the recess may, for example, be 4.5 mm. The bearing bush 10 is closed at this end by a cover plate 34. Within the recess 50 in the bearing bush 10, a stopper component taking the form of a stopper ring 46 is disposed that has a larger outside diameter, for example, 4.3 mm compared to the diameter of the shaft 12 of approx. 2.5 mm. The recess 50, in which the stopper ring 46 is disposed, is connected to the bearing gap as well as the recirculation channel 32 and is fully filled with bearing fluid. Should there be an excessive axial movement of the shaft 12, the stopper ring 46 strikes a step 48 that is formed by the transition between the bearing bore and the recess 50. The stopper ring 46 thus prevents the shaft 12 from falling out of the bearing bush 10.

An axial annular gap 52 that is several tens of a micrometer wide remains between a surface 52b of the stopper ring 46 extending in a radial direction and an adjoining radial surface 52a of the bearing bush 10. A disk-shaped gap 54 that is also several tens of a micrometer wide remains between the other radial surface of the stopper ring 46 and an adjoining radial surface of the cover plate 34. The two gaps 52, 54 are only formed when the bearing system is in operation since an axial equilibrium then prevails in the bearing that holds the stopper ring approximately at the center of the recess 50. In operation, the annular gap 52 is approximately 10 to 25 micrometers.

Figure 2:
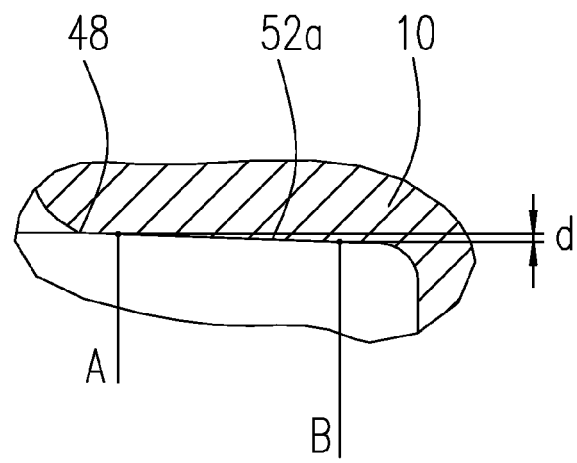
FIG. 2 shows a detail of the bearing bush of FIG. 1 in section.

FIG. 2 shows a detail of the bearing bush in section, namely the line of the surface 52a of the bearing bush 10 that bounds the annular gap 52. The surface 52a of the bearing bush 10 does not extend parallel to the surface 52b of the stopper ring 46, but rather at a slight angle. Between the two points A and B the surface 52a declines radially outwards by an amount d, which lies, for example, between 5 and 25 micrometers.

Figure 3:
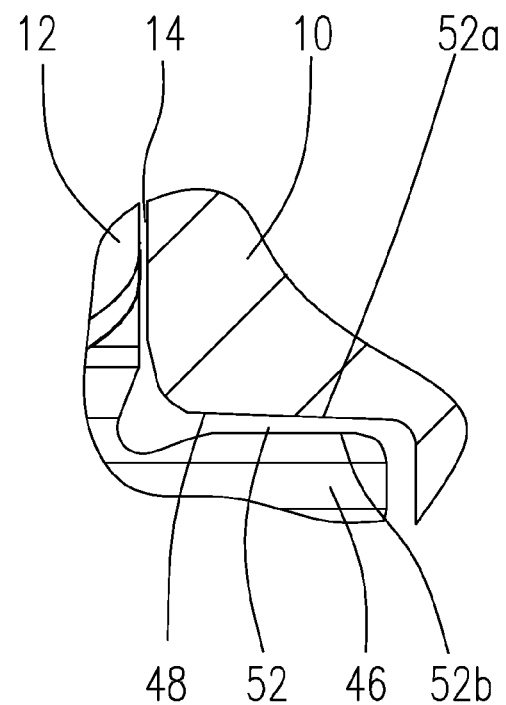
FIG. 3 shows a section of a first possible embodiment of the bearing of FIG. 1 in the region of the gap between the bearing bush and the stopper component.

FIG. 3 shows a section of the bearing in the region of the annular gap 52. It can be seen that the annular gap 52, i.e. the width of the annular gap 52, tapers radially outwards since the surface 52a of the bearing bush 10 extends at an acute angle to the surface 52b of the stopper ring 46. The thickness of the annular gap 52 decreases accordingly from the radially inner end to the radially outer end of the annular gap 52 by an amount d (FIG. 2), i.e. by 5 to 25 micrometers. The annular gap 52 between the two components 10, 46 forms a kind of radially outwards tapering throttle, where in the event of shock, the bearing fluid found in the annular gap 52 is squeezed radially outwards out of the annular gap 52 and has to pass through this throttle.

Figure 4:
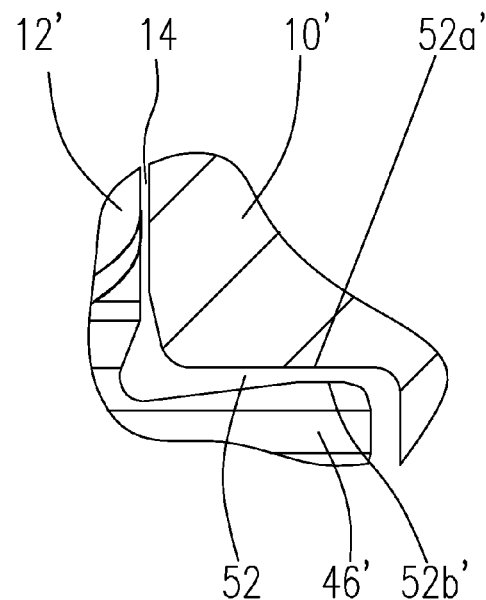
FIG. 4 shows a section of a second possible embodiment of the bearing of FIG. 1 in the region of the gap between the bearing bush and the stopper component.

FIG. 4 shows a section of another embodiment of the bearing in the region of the annular gap 52. Here again, the annular gap 52, i.e. the width of the annular gap 52, tapers, narrowing radially outwards. This is achieved in that the surface 52b' of the stopper ring 46' extends at an acute angle to the surface 52a' of the bearing bush 10'. The thickness of the annular gap 52' decreases accordingly from the radially inner to the radially outer end of the annular gap 52' by the amount d (FIG. 2), i.e. by 5 to 25 micrometers.

In the event of a shock, i.e. in the case of an axial force being exerted on the shaft 12, the shaft 12, 12', together with the stopper ring 46, moves in an axial direction within the bearing bush 10, 10', where the bearing fluid, which is found in the annular gap 52, 52' between the stopper ring 46, 46' and the bearing bush 10, 10', is squeezed radially outwards out of the annular gap 52, 52'. Through this force, particularly the stopper ring 46, 46', which, for example, is only between 0.4 millimeters and 0.5 millimeters thick, is deformed by a few micrometers. The stopper ring 46, 46' buckles, for example, so that the surface 52b, 52b' of the stopper ring declines towards the outside and then ends up approximately parallel to the surface 52a, 52a' of the bearing bush 10, 10'. I. e., that in the event of a shock, through the deformation of the stopper ring 46, 46', the annular gap 52, 52' again has a relatively constant thickness over its radial extension, so that a uniform bearing fluid film also remains in the annular gap 52 which, in the event of a shock, prevents the stopper ring 46, 46' or the surface 52b, 52b' of the stopper ring 46, 46' from jarring against the surface 52a, 52a' of the bearing bush 10, 10', or respectively ensures that the entire surface impacts rather than only a few points of the surface.

Figure 5:
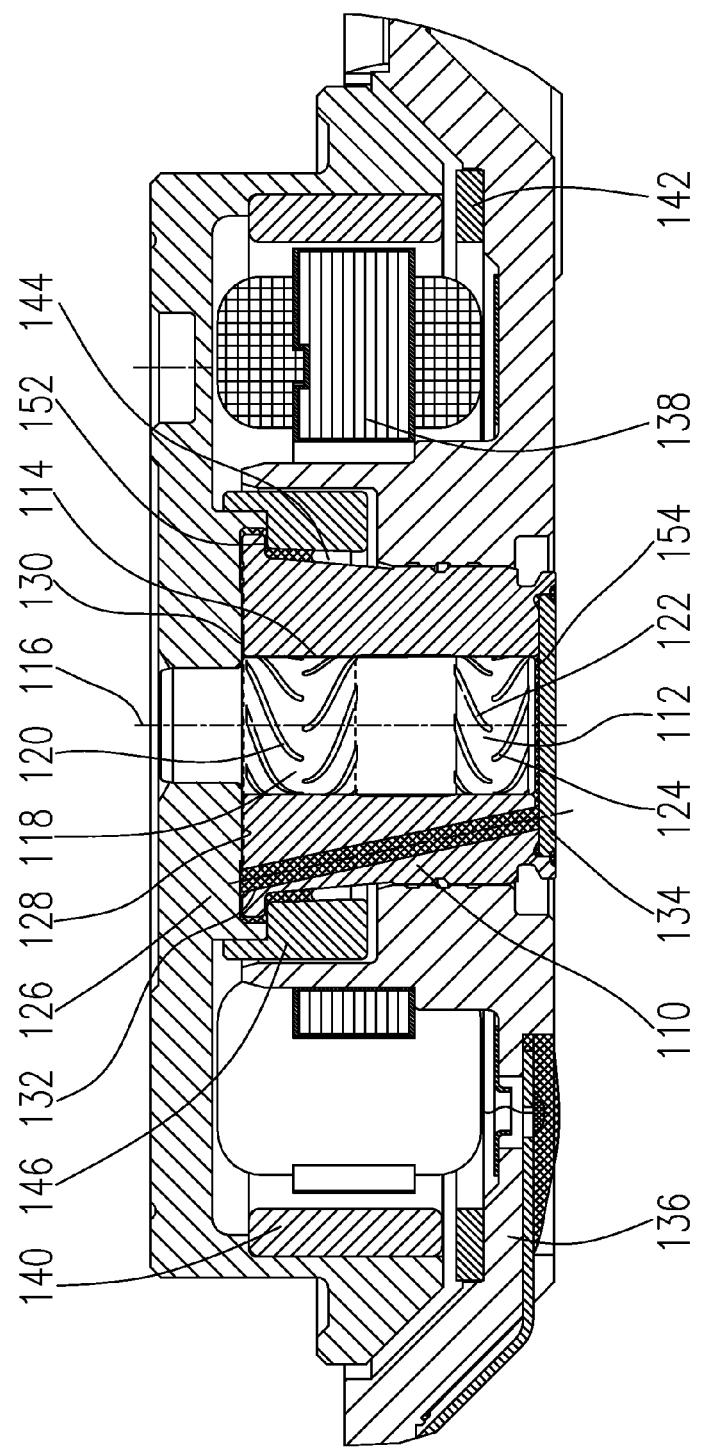
FIG. 5 shows a section through a second embodiment of a spindle motor having a fluid dynamic bearing according to the invention.

FIG. 5 shows a spindle motor having a fluid dynamic bearing system having a baseplate 136 on which the remaining motor components are fixed. The baseplate 136 comprises a central opening, in which a substantially hollow cylindrical bearing bush 110 is fixed, by means, for example, of pressing, bonding or welding.

A shaft 112 is rotatably disposed in the bore of the bearing bush 110 about a rotational axis 116. The shaft 112 has a slightly smaller diameter than the bore in the bearing bush 110, so that a bearing gap 114 filled with bearing fluid, such as a bearing oil, remains between the shaft 112 and the bearing bush 110. Along an axial section of the bearing gap 114, two fluid dynamic radial bearings 118, 122 are disposed at a mutual distance apart, the fluid dynamic radial bearings 118, 122 being marked by appropriate grooved bearing patterns 120, 124 on the surface of the bore of the bearing bush 110 or the circumferential surface of the shaft 112. On rotation of the shaft 112 in the bearing bush 110, a pumping effect is generated in the bearing fluid through these grooved bearing patterns 120, 124, by means of which hydrodynamic pressure is built up in the bearing gap 114, thus giving the radial bearings 118, 122 their load-carrying capacity. At least the upper radial bearing 118 preferably has a pumping effect in a specific axial direction, preferably in the direction of the closed end of the bearing that is sealed by a cover plate 134 that is fixed in a recess in the bearing bush 110 and hermetically seals the bearing bush.

A stator arrangement 138 is fixed on the baseplate 136 and forms a part of an electromagnetic drive system of the spindle motor. The stator arrangement 138 is made up of a ferromagnetic magnetic core as well as appropriate phase windings.

A free end of the shaft 112, which protrudes beyond the bore of the bearing bush 110, is connected to a rotor component 126 that has an essentially cup-shaped cross-section and partially encloses the bearing system as well as a stator arrangement 138. The rotor component 126 is pressed, for example, onto the free end of the shaft 112. The rotor component 126 has a circumferential, approximately cylindrical rim on whose inside diameter a rotor magnet 140 is fixed that augments the stator arrangement 136 and together with the stator arrangement 136 forms the electromagnetic drive system. If the spindle motor is used for driving a hard disk drive, one or more storage disks (not illustrated) are fixed, for example, on the rotor component 126. Opposite the rotor magnet 140 in an axial direction, a metal ring 142 is provided that acts as an axial magnetic bearing in that it attracts the rotor magnet 140 and preloads the rotor component 126 in an axial direction and stabilizes it.

As mentioned above, the open end of the bearing bush 110 is sealed by the cover plate 134, a disk-shaped gap 154 filled with bearing fluid remaining between the end of the shaft 112 and the cover plate 134.

The upper end face of the bearing bush 110, which adjoins the rotor component 126, is designed as an axial bearing surface, as is also the adjoining surface of the rotor component 126. The two axial bearing surfaces of the bearing bush 110 and the rotor component 126 form an axial bearing 128, which, like the radial bearings 118, 122, are also marked by grooved bearing patterns 130 that are disposed on the surface of the bearing bush 110 and/or the surface of the rotor component 126. The axial bearing 128 is disposed along a radially extending section of the bearing gap 114 that is attached to the axially extending section of the bearing gap 114. The axial bearing 128 comprises, for example, spiral-shaped or herringbone grooved bearing patterns 130 that generate a pumping effect directed in the direction of the radial bearings 118, 122 and that force the bearing fluid into the interior of the bearing gap 114.

Radially outside the axial bearing 128, the bearing gap 114 widens into a gap that now bends somewhat at a right angle and merges into an axially extending sealing gap 144 that is formed as a capillary seal, particularly a tapered capillary seal. The sealing gap 144 is defined by an outer sleeve surface of the bearing bush 110 and an opposing annular sleeve surface of an annular component that simultaneously acts as a stopper component 146. The surfaces of the bearing bush 110 and of the stopper component 146 defining the sealing gap 144 may extend, for example, parallel to the rotational axis 116, however, they are preferably slightly inclined with respect to the rotational axis 116 such that the inside diameter of the stopper component 146 decreases to a slighter extent in the direction of the opening of the sealing gap 114 than the outside diameter of the bearing bush 110, thus producing an essentially tapered and radially inwards inclined cross-section for the sealing gap 144. The annular stopper component 146 is fixed to an annular shoulder of the rotor component 126 and lies opposite a stopper flange 110a of the bearing bush 110 and, together with the stopper flange 110a, prevents the arrangement of the rotor component 116 and the shaft 112 from falling out of the bearing bush 110.

Figure 6:
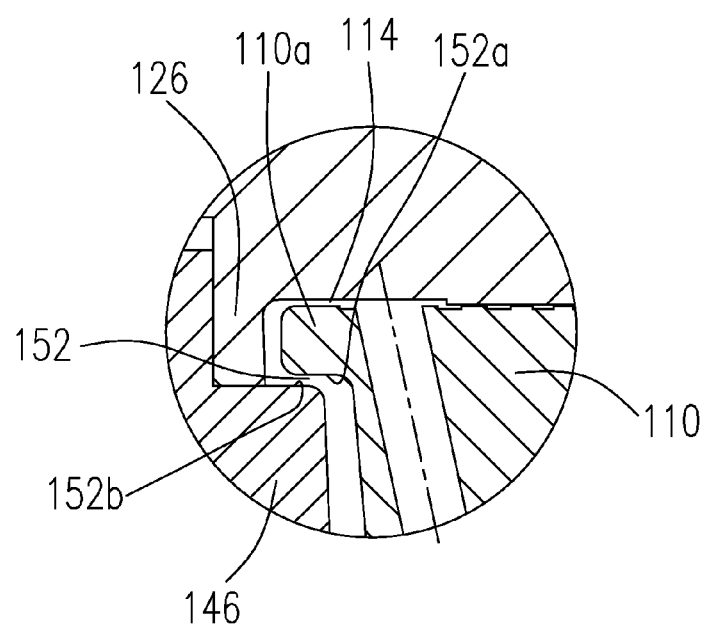
FIG. 6 shows a detail from FIG. 5 in the region of the stopper component.

As can be particularly seen from FIG. 6, the stopper flange 110a has a larger outside diameter compared to the diameter of the bearing bush 110 and overlaps the stopper component 146 in a radial direction. The overlapping surfaces of the stopper component 146 and stopper flange 110a are located in the region of the sealing gap 144 and are flushed with bearing fluid. In the event of any excessive axial movement of the shaft 110 and thus the rotor component 126, the stopper component 146 strikes against the stopper flange 110a. An annular gap 152 that is several tens of a micrometer wide remains between the surface 152b of the stopper component 146 extending in a radial direction and an adjoining radial surface 152a of the bearing bush 110. In operation, the annular gap 152 in an axial direction is approximately 10 to 25 micrometers. According to the invention, the surface 152a of the bearing bush 110 does not extend parallel to the surface 152b of the stopper component 146, but rather at a slight angle. This causes the annular gap 152, i.e. the width of the annular gap 152, to taper radially outwards, since the surface 152a of the bearing bush 110 extends at an acute angle to the surface 152b of the stopper component 146. As an alternative, the surface 152b of the stopper component 146 may extend at an angle to the surface 152a of the bearing bush 110. This causes the annular gap 152, i.e. the width of the annular gap 152, to taper radially outwards, since the surface 152a of the bearing bush 110 and the surface 152b of the stopper component 146 are not parallel with respect to one another.

A recirculation channel 132 is preferably provided within the bearing bush that connects the closed end of the bearing gap, i.e. the region of the disk-shaped gap 154 at the lower end of the shaft 110, to the open end of the bearing gap radially outside the axial bearing 128.

Figure 7:
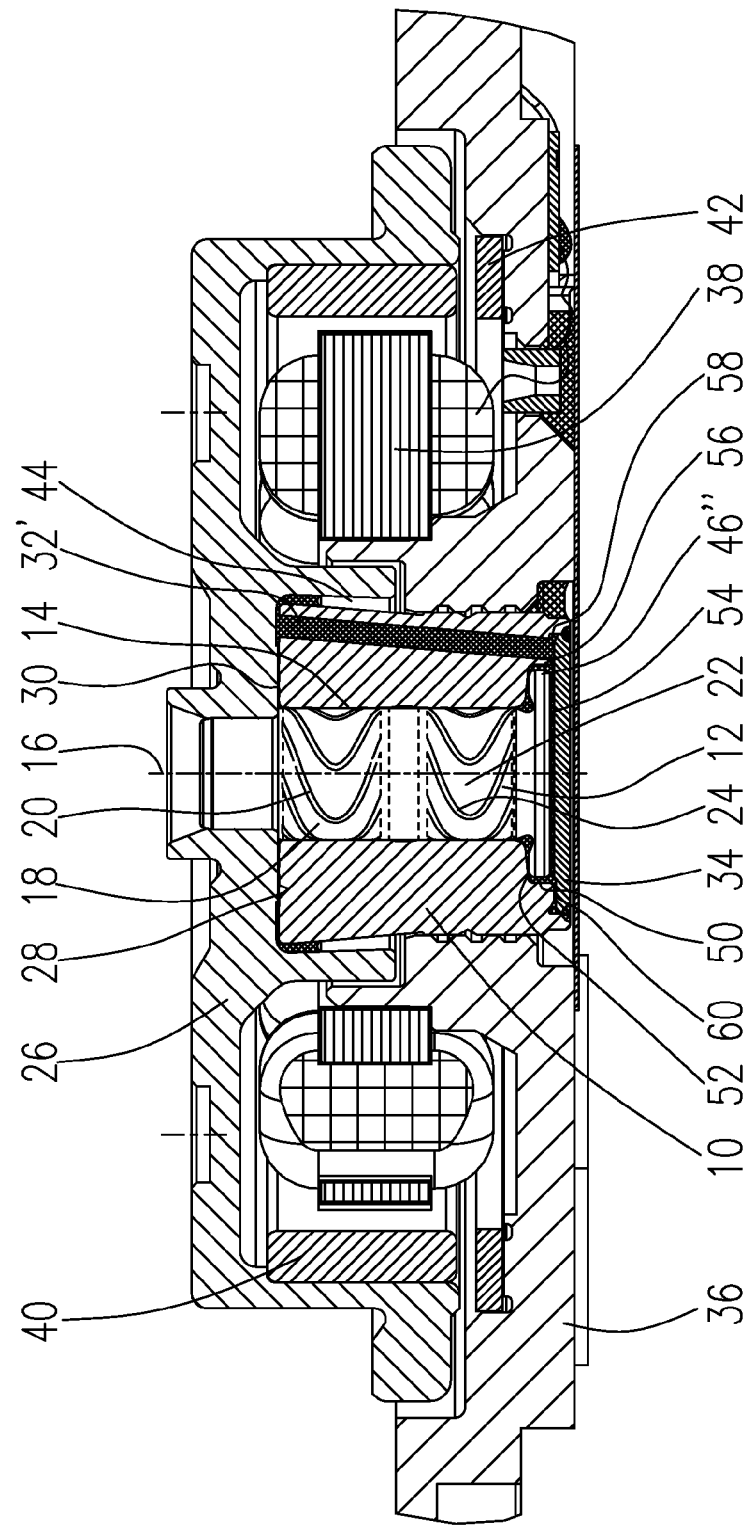
FIG. 7 shows a section through a third embodiment of a spindle motor having a fluid dynamic bearing according to the invention.

FIG. 7 shows a section through a spindle motor having another embodiment of a bearing system according to the invention. The spindle motor is designed substantially identically to the spindle motor shown in FIG. 1, identical components being indicated by the same reference numbers. The description with reference to FIG. 1 thus also applies to FIG. 7. The spindle motor illustrated in FIG. 7 differs from the spindle motor of FIG. 1 essentially by the arrangement of the recirculation channel 32'.

Figure 8:
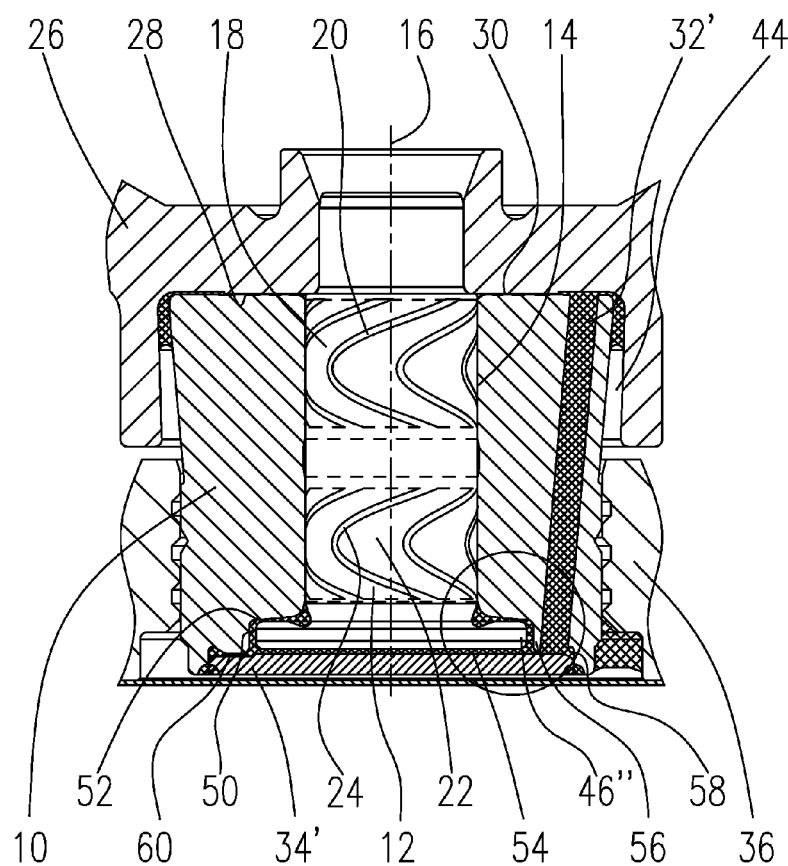
FIG. 8 shows the fluid dynamic bearing of FIG. 7 in detail.
Figure 8A:
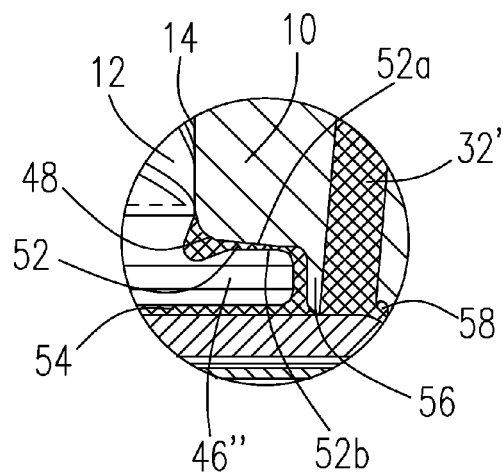
FIG. 8A shows a section through the bearing of FIG. 8 in the region of the gap between the bearing bush and the stopper component.

FIGS. 8 and 8A show an enlarged view of FIG. 7 in the region of the bearing system or of the stopper ring 46" respectively.

The recirculation channel 32' is disposed in the bearing bush 10 and connects a transitional region between the bearing gap 14 radially outside the axial bearing 28 and the sealing gap 44 directly to the interior of the bearing in the region of the cover plate 34'. In FIG. 1, the recirculation channel ends directly at the stopper ring 46 in the region of its outside circumference, whereas the recirculation channel 32' according to FIGS. 7, 8 and 8A is led directly to the cover plate 34' and is separated from the outside circumference of the stopper ring 46" by a bridge 56. In other words, the lower mouth of the recirculation channel 32' is separated from the annular gap 52 or the disk-shaped gap 54 and ends at the rim of the cover plate 34' in an undercut 58 disposed in the bearing bush 10. The undercut 58 does not need to be disposed in the bearing bush 10 but could, as an alternative be disposed as an annular recess in the cover plate 34'.

Through one or more recesses 60 in the cover plate 34' extending radially inwards from the undercut 58, the recirculation channel 32' is connected to the gaps 52 or 54. Due to the relatively narrow connection afforded by the recesses 60 between the recirculation channel 32' and the gaps 52 or 54, in the event of a shock, the bearing fluid found in the gaps 52, 54 cannot flow off unimpeded through the recirculation channel, rather the bearing fluid is subjected to some resistance thus improving the shock resistance. Moreover, the annular gap 52 is so designed, as described with reference to FIG. 1, that it tapers, narrowing radially outwards, so that here again in the event of a shock, a corresponding damping or throttling effect comes into play so as to intensify the damping effect in the bearing.

FIG. 8A shows an enlarged view of the region of the outside diameter of the stopper ring 46" with the gaps 52 and 54, the bridge 56 that separates the region of the outside diameter of the stopper ring 46" from the lower mouth of the recirculation channel 32', and the undercut 58 at the outside circumference and lower end of the recirculation channel 32'.

Figure 9:
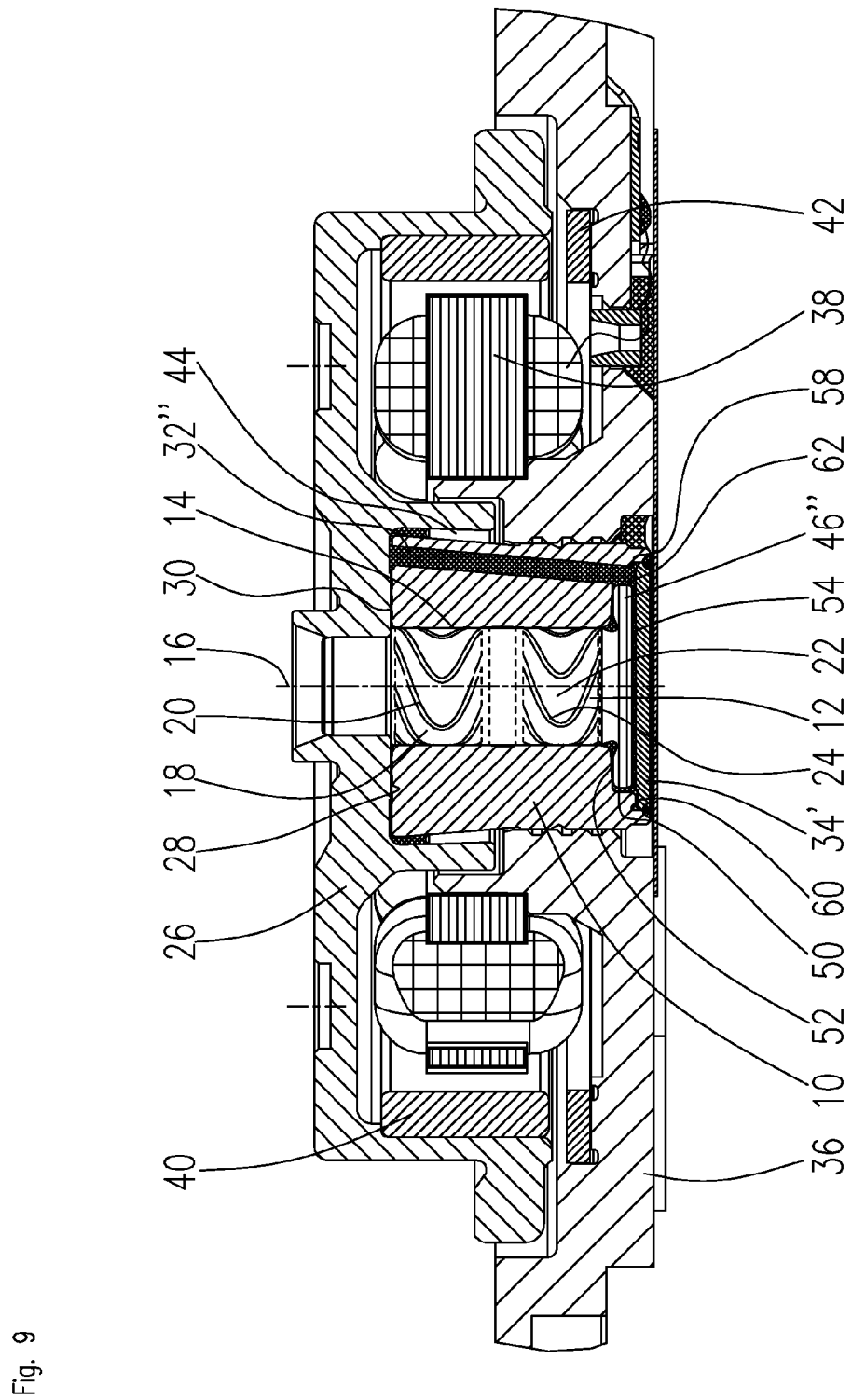
FIG. 9 shows a section through a fourth embodiment of a spindle motor having a fluid dynamic bearing according to the invention.
Figure 10:
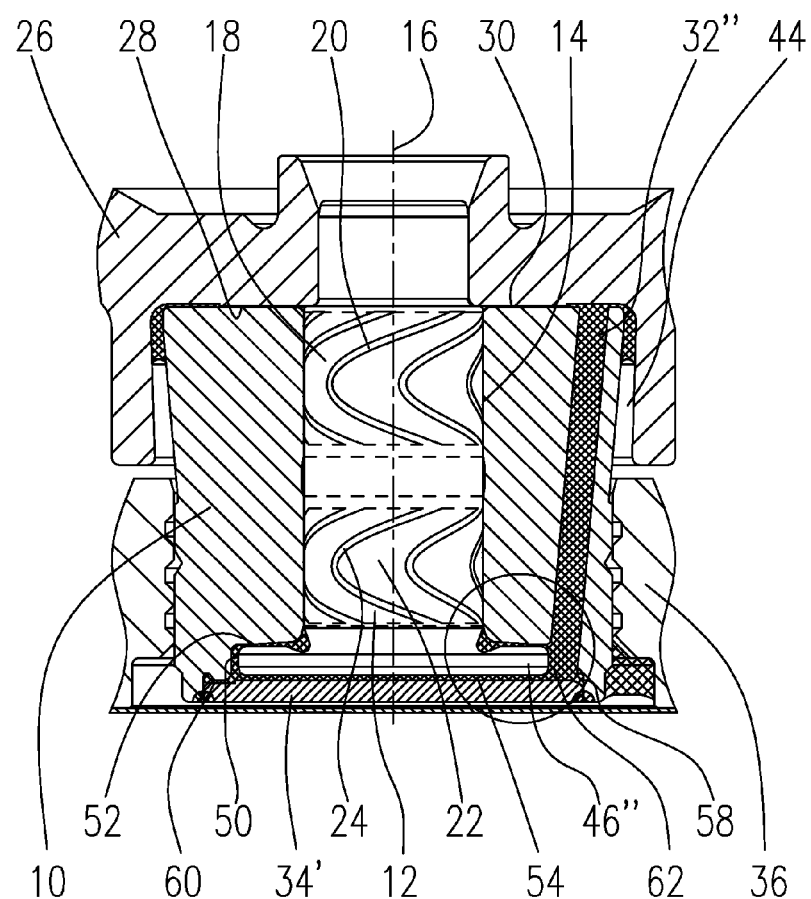
FIG. 10 shows the fluid dynamic bearing of FIG. 9 in detail.
Figure 10A:
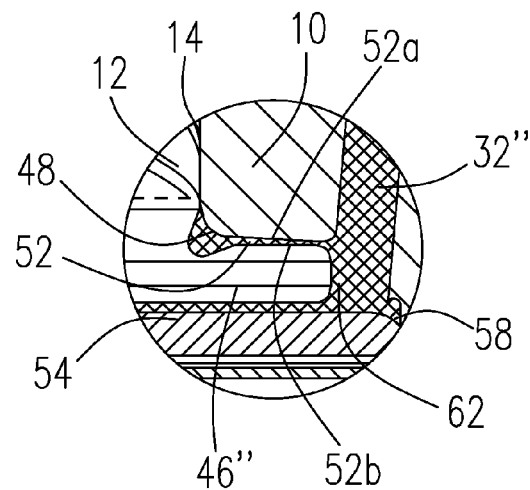
FIG. 10A shows a section through the bearing of FIG. 10 in the region of the gap between the bearing bush and the stopper component.

FIGS. 9, 10 and 10A show a section through a spindle motor having a further embodiment of a bearing according to the invention. The spindle motor corresponds largely to the spindle motor of FIG. 1, identical components being indicated by the same reference numbers. The basic description of the function of the spindle motor of FIG. 1 also applies to the spindle motor shown in FIGS. 9, 10, and 10A.

In contrast to FIG. 1, the arrangement of the recirculation channel 32" is of a different design. The recirculation channel 32" connects a transitional region between the bearing gap 14 radially outside the axial bearing 28 and the sealing gap 44 to a region of the bearing radially outside the stopper ring 46".

The recirculation channel 32" ends completely beyond the outside circumference of the stopper ring 46" without overlapping with the stopper ring 46" in an axial direction.

In other words, the smallest inside radius of the recirculation channel 32" is greater than the largest outside radius of the stopper ring 46".

In the event of a shock impulse to the bearing, the bearing fluid found in the bearing gap 14 and the annular gap 52 has to first flow through the narrow annular gap 52, which narrows radially outwards, in order to then reach the recirculation channel 32", so that the bearing fluid is subjected to the largest possible resistance which goes to improve damping.

The recirculation channel 32" ends in a space 62 radially outside the stopper ring 46", where, as illustrated in FIGS. 10 and 10A, an annular undercut 58 may in turn be disposed at the outside diameter of the space 62 that conducts the bearing fluid annularly to the recirculation channel 32'. The undercut 58 is connected via recesses 60 in the cover plate 34' to the gaps 52 or 54.

Again in this embodiment, the design or arrangement of the recirculation channel 32" is combined with the tapering annular gap 52 so as to achieve the highest possible damping of the bearing, in that the bearing fluid is confronted by the greatest possible resistance during any shock effect.

Figure 11:
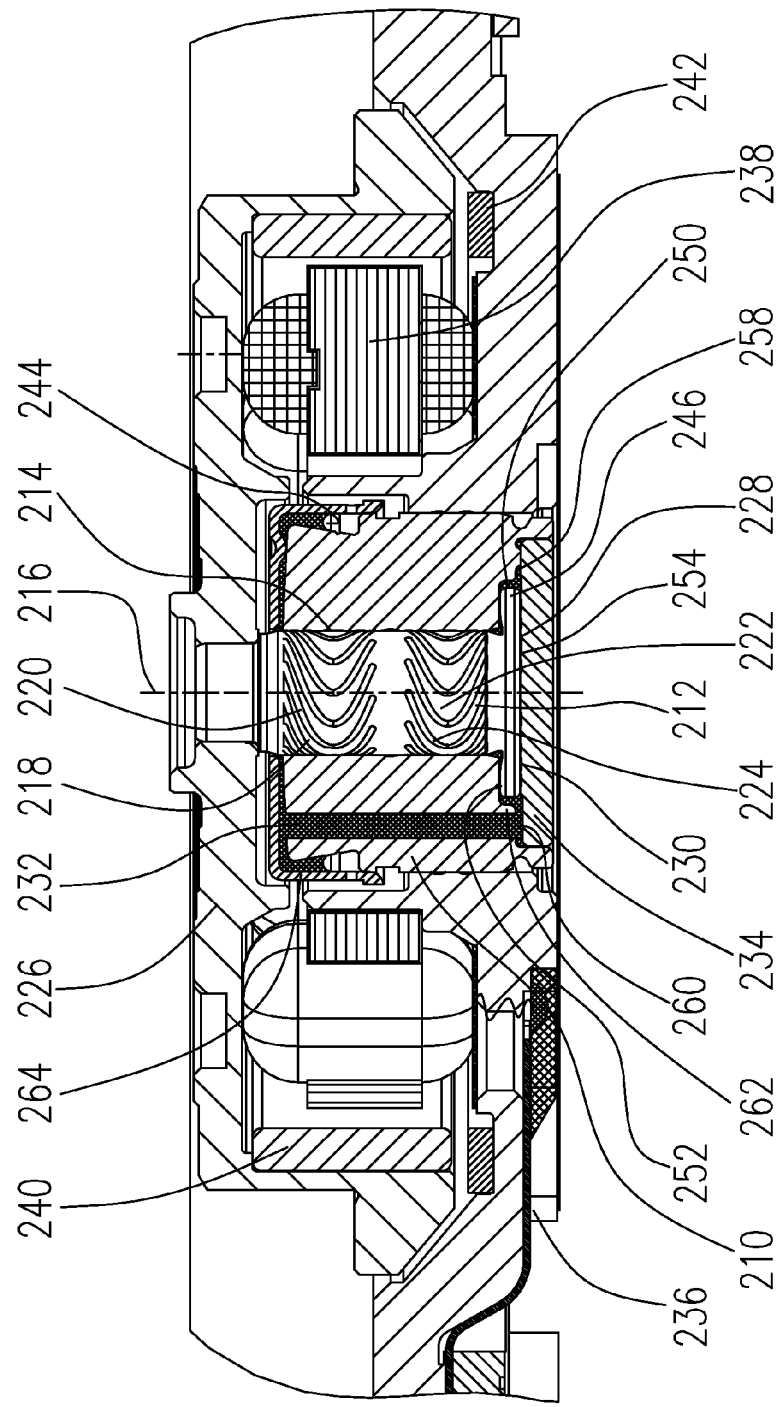
FIG. 11 shows a section through a fifth embodiment of a spindle motor having a fluid dynamic bearing according to the invention.

FIG. 11 shows a section through a spindle motor in a modified embodiment vis-à-vis the previous figures. The spindle motor comprises a bearing bush 210, in which a shaft 212 is rotatably supported. Two fluid dynamic radial bearings 218, 222 are formed between the mutually opposing surfaces of the shaft 212 and of the bearing bush 210, the fluid dynamic radial bearings 218, 222 being marked by grooved bearing patterns 220, 224 that are disposed on the surface of the shaft 212 or the surface of the bearing bush 210.

The bearing surfaces are separated from each other by a bearing gap 214 that is filled with a bearing fluid. A free end of the shaft 212 is connected to a rotor component 226 that can be set in rotation together with the shaft 212. The upper end face of the bearing bush 210 is closed by a cover cap 264, a space being formed between the end face of the bearing bush 210 and the cover cap 264 that acts as a reservoir for the bearing fluid and as a sealing gap 244, and which, starting from the bearing gap 214, initially widens radially outwards and then bending by 90 degrees extends in an axial direction parallel to the shaft 212.

At the lower end of the shaft 212, the bearing bush 210 has a recess 250 whose diameter is larger than the diameter of the shaft 212 or the bearing bore. The bearing bush 210 is covered at this end by a cover plate 234. Within the recess 250 of the bearing bush 210, a stopper component taking the form of a stopper ring 246 is disposed on the shaft 212. The recess 250, in which the stopper ring 246 is disposed is connected to the bearing gap 214 and filled fully with bearing fluid. The stopper ring 246 prevents the shaft 212 from falling out of the bearing bush 210.

An annular gap 254 is formed between the underside of the stopper ring 246 and the opposing side of the cover plate 234. The surface of the cover plate 234 or the surface of the stopper ring 246 is provided with grooved bearing patterns 230 that form a fluid dynamic axial bearing 228 which generates a force directed upwards in the direction of the rotor component 226.

The bearing bush 210 is disposed in a baseplate 236 of the spindle motor and enclosed by a stator arrangement 238 that is fixed to the baseplate 236. The stator arrangement 238 operates together with a rotor magnet 240 fixed to an inner rim of the rotor component 226. A ferromagnetic metal ring 242 that is attracted by the rotor magnet 240 is disposed below the rotor magnet 240, thus producing a force directed downwards in the direction of the baseplate 236. This force acts in opposition to the bearing load of the axial bearing 228, thus producing an axial preload for the bearing system, which holds the bearing in equilibrium in an axial direction.

An annular gap 252 is formed between a surface of the stopper ring 246 extending in a radial direction and an adjoining radial surface of the bearing bush 210. The annular gap 252 does not have a uniform width but rather tapers radially outwards, which results in the improved damping effect according to the invention during shock conditions, as described in connection with the previously described embodiments of the invention.

A recirculation channel 232 is disposed between the radial section of the sealing gap 244 and a space 262 radially outside the stopper ring 246, the recirculation channel 232 connecting these two sections of the bearing to one another. The recirculation channel extends essentially parallel to the rotational axis 216 within the bearing bush 210.

So as not to unnecessarily influence the throttling function of the tapering gap 252, the recirculation channel 232 ends at the radially outer end of the gap 252 in a space 262. The space 262 may form a part of a circumferential undercut 258 in which the bearing fluid collects and can flow off via the recirculation channel 232. Hence the space 262, in which the recirculation channel 232 ends, is connected to the disk-shaped gap 254 solely via a small gap in form of a recess 260. The recess 260 is preferably arranged in the cover plate 234, as shown in FIG. 11, or may alternatively be arranged in the bearing bush 210 (not shown in the drawings).

Identification reference list

| | |
|---|---|
| 10, 10', 110, 210 | Bearing bush |
| 110a | Stopper flange |
| 12, 12', 112, 212 | Shaft |
| 14, 114, 214 | Bearing gap |
| 16, 116, 216 | Rotational axis |

-continued

Identification reference list

| | |
|---|---|
| 18, 118, 218 | Radial bearing |
| 20, 120, 220 | Grooved bearing patterns |
| 22, 122, 222 | Radial bearing |
| 24, 124, 224 | Grooved bearing patterns |
| 26, 126, 226 | Rotor component (hub) |
| 28, 128, 228 | Axial bearing |
| 30, 130, 230 | Grooved bearing patterns |
| 32, 32', 32" 132, 232 | Recirculation channel |
| 34, 34', 134, 234 | Cover plate |
| 36, 136, 236 | Baseplate |
| 38, 138, 238 | Stator arrangement |
| 40, 140, 240 | Rotor magnet |
| 42, 142, 242 | Metal ring |
| 44, 144, 244 | Sealing gap |
| 46, 46', 46", 146, 246 | Stopper component |
| 48 | Step |
| 50, 250 | Recess |
| 52, 152, 252 | Annular gap |
| 52a, 152a, 52a | Surface (bearing bush) |
| 52b, 152b, 52b' | Surface (stopper component) |
| 54, 154, 254 | Disk-shaped gap |
| 56 | Bridge |
| 58, 258 | Undercut |
| 60, 260 | Recess |
| 62, 262 | Space |
| 264 | Cover cap |
| d | Distance |

The invention claimed is:

1. A fluid dynamic bearing comprising:
a bearing bush and a shaft that are rotatable with respect to each other about a common rotational axis;
a bearing gap that is disposed between associated bearing surfaces and is filled with a bearing fluid, wherein the bearing surfaces form at least one fluid dynamic radial bearing;
a rotor component disposed on the shaft;
a stopper component that is disposed on the shaft and to which the bearing bush adjoins;
an annular gap that is formed between mutually facing surfaces of the bearing bush and the stopper component, filled with the bearing fluid and connected to the bearing gap and extending substantially in a radial direction, wherein mutually facing surfaces of the bearing bush and the stopper component are formed such that the axial extension of the annular gap continuously tapers over substantially all its course, narrowing radially outwards; and
a recirculation channel that ends directly opposite of a cover plate and that is separated from an outside circumference of the stopper component by a bridge, wherein a lower mouth of the recirculation channel is separated from the annular gap and ends at a rim of the cover plate in an undercut disposed in the bearing bush or in an annular recess in the cover plate and wherein the smallest inner radius of the recirculation channel is larger than the largest outer radius of the stopper component, when measured from the rotational axis.

2. A fluid dynamic bearing system according to claim 1, characterized in that the surface of the bearing bush facing the stopper component is designed such that its axial distance to the surface of the stopper component decreases over its course in a radially outwards direction.

3. A fluid dynamic bearing system according to claim 1, characterized in that the surface of the stopper component facing the bearing bush is designed such that its axial distance to the surface of the bearing bush decreases over its course in a radially outwards direction.

4. A fluid dynamic bearing system according to claim 1, characterized in that the stopper component is disposed in a recess of the bearing bush, wherein the recess is disposed at an end face of the bearing bush and is closed by the cover plate.

5. A fluid dynamic bearing system according to claim 1, characterized in that the surface of the stopper component is separated from the adjoining surface of the cover plate by a disk-shaped gap that is filled with bearing fluid and connected to an annular gap.

6. A fluid dynamic bearing system according to claim 1, characterized in that the rotor component partially encloses the bearing bush while forming a sealing gap connected to the bearing gap.

7. A fluid dynamic bearing system according to claim 6, characterized in that the sealing gap is attached to one side of the bearing gap and is disposed between a radially outwards directed sleeve surface of the bearing bush and an opposing radially inwards directed sleeve surface of the rotor component and is at least partially filled with bearing fluid.

8. A fluid dynamic bearing system according to claim 1, characterized in that the recirculation channel has an upper mouth that ends in a gap region between the bearing gap and a sealing gap radially outside of an axial bearing.

9. A fluid dynamic bearing system according to claim 1, characterized in that the recirculation channel ends directly opposite of the cover plate.

10. A fluid dynamic bearing system according to claim 1, characterized in that in the region of the lower mouth of the recirculation channel between the bearing bush and the cover plate an annular undercut is disposed in the bearing bush or in the cover plate.

11. A fluid dynamic bearing system according to claim 10, characterized in that the surface of the stopper component is separated from the adjoining surface of the cover date by a disk-shaped gap, and in that the undercut is connected via at least one radially extending channel in the bearing bush or the cover plate to the disk-shaped gap.

12. A fluid dynamic bearing system according to claim 1, characterized in that the bearing surfaces of the bearing bush and/or the bearing surfaces of the shaft are provided with pressure-generating grooved bearing patterns forming a part of the at least one fluid dynamic radial bearing.

13. A fluid dynamic bearing system according to claim 1, characterized in that an end face of the bearing bush and/or a surface of the rotor component lying opposite this end face is provided with pressure-generating grooved bearing patterns and forms a fluid dynamic axial bearing.

14. A fluid dynamic bearing system according to claim 1, characterized in that an end face of the stopper component and/or a surface of the cover plate lying opposite this end face is provided with pressure-generating grooved bearing patterns and forms a fluid dynamic axial bearing.

15. A spindle motor having a fluid dynamic bearing system comprising:
a baseplate;
a bearing bush fixed in the baseplate and a shaft that is rotatable with respect to tile bearing bush about a common rotational axis;
a bearing gap that is disposed between associated bearing surfaces and is filled with a bearing fluid, wherein the bearing surfaces form at least one fluid dynamic radial bearing;
a rotor component disposed on the shaft;
a stopper component that is disposed on the shaft and to which the bearing bush adjoins;
an annular gap that is formed between mutually facing surfaces of the bearing bush and the stopper component, filled with the bearing fluid and connected to the bearing gap and extending substantially in a radial direction, wherein mutually facing surfaces of the bearing bush and the stopper component are formed such that the axial extension of the annular gap continuously tapers over substantially all its course, narrowing radially outwards, and wherein a recirculation channel is provided in the bearing bush that connects a gap region between the bearing gap and a sealing gap radially outside an axial bearing to a gap region radially outside the stopper component, and wherein the recirculation channel ends directly opposite of a cover plate and is separated from an outside circumference of the stopper component by a bridge, wherein a lower mouth of the recirculation channel is separated from the annular gap and ends at a rim of the cover plate in an undercut disposed in the bearing bush or in an annular recess in the cover plate, and wherein the smallest inner radius of the recirculation channel is larger than the largest outer radius of the stopper component when measured from the rotational axis; and
an electromagnetic drive system for driving the arrangement of shaft and rotor component.

16. A spindle motor according to claim 15 for driving in rotation at least one magnetic storage disk of a hard disk drive.

17. A fluid dynamic bearing system according to claim 1, characterized in that the axial extension of the annular gap continuously tapers between a radially innermost portion of the annular gap and a portion of the annular gap that is closer to a radially outermost portion of the annular gap than to the radially innermost portion of the annular gap.

18. A spindle motor according to claim 15, characterized in that the axial extension of the annular gap continuously tapers between a radially innermost portion of the annular gap and a portion of the annular gap that is closer to a radially outermost portion of the annular gap than to the radially innermost portion of the annular gap.

19. A fluid dynamic bearing comprising:
a bearing bush and a shaft that are rotatable with respect to each other about a common rotational axis;
a bearing gap that is disposed between associated bearing surfaces and is filled with a bearing fluid, wherein the bearing surfaces form at least one fluid dynamic radial bearing;
a rotor component disposed on the shaft;
a stopper component that is disposed on the shaft and to which the bearing bush adjoins;
an annular gap that is formed between mutually facing surfaces of the bearing bush and the stopper component, filled with the bearing fluid and connected to the bearing gap and extending substantially in a radial direction, wherein mutually facing surfaces of the bearing bush and the stopper component are formed such that the axial extension of the annular gap tapers over its course, narrowing radially outwards, and wherein the axial extension of the annular gap is 5 to 25 micrometers greater at its radially inner end than at its radially outer end; and
a recirculation channel that ends directly opposite of a cover plate and that is separated from an outside circumference of the stopper component by a bridge, wherein a lower mouth of the recirculation channel is separated from the annular gap and ends at a rim of the cover plate in an undercut disposed in the bearing bush or in an annular recess in the cover plate, and wherein the smallest inner radius of the recirculation channel is larger than the largest outer radius of the stopper component, when measured from the rotational axis.

20. A spindle motor having a fluid dynamic bearing system comprising:
- a baseplate;
- a bearing bush fixed in the baseplate and a shaft that is rotatable with respect to tile bearing bush about a common rotational axis;
- a bearing gap that is disposed between associated bearing surfaces and is filled with a bearing fluid, wherein the bearing surfaces form at least one fluid dynamic radial bearing;
- a rotor component disposed on the shaft;
- a stopper component that is disposed on the shaft and to which the bearing bush adjoins;
- an annular gap that is formed between mutually facing surfaces of the bearing bush and the stopper component, filled with the bearing fluid and connected to the bearing gap and extending substantially in a radial direction, wherein mutually facing surfaces of the bearing bush and the stopper component are formed such that the axial extension of the annular gap tapers over its course, narrowing radially outwards, and wherein the axial extension of the annular gap is 5 to 25 micrometers greater at its radially inner end than at its radially outer end, and wherein a recirculation channel is provided in the bearing bush that connects a gap region between the bearing gap and the sealing gap radially outside the axial bearing to a gap region radially outside the stopper component, and wherein the recirculation channel ends directly opposite of a cover plate and is separated from an outside circumference of the stopper component by a bridge wherein a lower mouth of the recirculation channel is separated from the annular gap and ends at a rim of the cover plate in an undercut disposed in the bearing bush or in an annular recess in the cover plate, and wherein the smallest inner radius of the recirculation channel is larger than the largest outer radius of the stopper component, when measured from the rotational axis; and
- an electromagnetic drive system for driving the arrangement of shaft and rotor component.

\* \* \* \* \*